(12) United States Patent
Kwon et al.

(10) Patent No.: US 11,913,384 B1
(45) Date of Patent: Feb. 27, 2024

(54) LEAF SPRING AND SEALING ASSEMBLY INCLUDING SAME

(71) Applicant: DOOSAN ENERBILITY CO., LTD., Changwon-si (KR)

(72) Inventors: Tae Young Kwon, Changwon (KR); Kyeong Yun So, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/058,900

(22) Filed: Nov. 28, 2022

(30) Foreign Application Priority Data

Dec. 1, 2021 (KR) .................. 10-2021-0170002

(51) Int. Cl.
*F01D 11/00* (2006.01)
*F02C 7/28* (2006.01)

(52) U.S. Cl.
CPC .............. *F02C 7/28* (2013.01); *F01D 11/001* (2013.01); *F05D 2240/57* (2013.01); *F05D 2260/38* (2013.01)

(58) Field of Classification Search
CPC .... F16J 15/3288; F16J 15/442; F16J 15/3212; F16J 15/3452; F16J 15/3456; F05D 2240/57; F01D 11/001
See application file for complete search history.

(56) References Cited

U.S. PATENT DOCUMENTS

| | | | |
|---|---|---|---|
| 2,786,648 A * | 3/1957 | Ledwith .................. | F01D 5/323 416/221 |
| 5,374,068 A * | 12/1994 | Jewett .................... | F16J 15/441 277/303 |
| 6,022,027 A * | 2/2000 | Chevrette .............. | F16J 15/442 277/416 |
| 6,331,006 B1 * | 12/2001 | Baily .................... | F16J 15/3288 277/355 |
| 6,935,634 B2 * | 8/2005 | Zuo ........................ | F16J 15/442 277/421 |

(Continued)

FOREIGN PATENT DOCUMENTS

| | | |
|---|---|---|
| GB | 691380 A | 5/1953 |
| JP | H05215241 A | 8/1993 |

(Continued)

OTHER PUBLICATIONS

The EESR, dated Apr. 14, 2023.
The KR Office Action, dated Nov. 16, 2023.

*Primary Examiner* — Justin D Seabe
(74) *Attorney, Agent, or Firm* — Harvest IP Law, LLP (57) ABSTRACT

A leaf spring inserted between a sealing member installed between various components of a gas turbine to prevent an inflow and outflow of gases and a mating sealing member, and a sealing assembly including the same are proposed. The leaf spring includes a curved body section, a locking protrusion protruding in one direction at an end of the body section so as to be fitted into the locking groove of the sealing member, and a detachment-prevention protrusion protruding in a direction opposite to the locking protrusion and configured to comes into contact with one surface of the mating sealing member and prevent the locking protrusion from being detached from the locking groove when the body section is compressed by the sealing member and the mating sealing member.

18 Claims, 7 Drawing Sheets

(56) References Cited

U.S. PATENT DOCUMENTS

| | | | |
|---|---|---|---|
| 8,105,016 B2 * | 1/2012 | Butz | ........................ F01D 9/042 |
| | | | 415/119 |
| 9,822,668 B2 * | 11/2017 | Duguay | .................. F01D 11/08 |
| 2008/0019836 A1 | 1/2008 | Butz | |
| 2009/0010762 A1 | 1/2009 | Caucheteux | |

FOREIGN PATENT DOCUMENTS

| | | | | | |
|---|---|---|---|---|---|
| JP | 2004052758 | A | | 2/2004 | |
| JP | 2009108918 | A | | 5/2009 | |
| JP | 2010073374 | A | | 4/2010 | |
| JP | 2015010713 | A | | 1/2015 | |
| JP | 2015-513029 | A | | 4/2015 | |
| JP | 2016156421 | A | | 9/2016 | |
| JP | 2016223426 | A | * | 12/2016 | ............ F01D 11/003 |
| KR | 10-0569648 | B1 | | 4/2006 | |
| KR | 1020140068077 | A | | 6/2014 | |
| KR | 20 0487211 | Y1 | | 8/2018 | |
| KR | 10 1920693 | B1 | | 2/2019 | |
| KR | 10 2038112 | B1 | | 10/2019 | |
| KR | 20210106658 | A | | 8/2021 | |

* cited by examiner

LEAF SPRING AND SEALING ASSEMBLY INCLUDING SAME

CROSS REFERENCE TO RELATED APPLICATION

The present application claims priority to Korean Patent Application No. 10-2021-0170002, filed on Dec. 1, 2021, the entire contents of which are incorporated herein for all purposes by this reference.

BACKGROUND OF THE INVENTION

1. Field of the Invention

The present disclosure relates to a leaf spring inserted between a sealing member, more particularly, a leaf spring inserted between a sealing member installed between various components of a gas turbine, and a sealing assembly including the same.

2. Description of the Background Art

Generally, turbines, such as steam turbines, gas turbines, and the like, are machines that obtain rotating force with impulsive force using a flow of a compressed fluid such as gas.

The gas turbine generally includes a compressor, a combustor, and a turbine. The compressor has a compressor casing in which compressor vanes and compressor blades are alternately arranged, along with an air inlet to provide compressed air.

The combustor serves to supply fuel to the compressed air provided from the compressor and ignite the air-fuel mixture with a burner to produce high temperature and high pressure combustion gas.

The turbine has a turbine casing in which turbine vanes and turbine blades are alternately arranged. A rotor is centrally disposed through the compressor, the combustor, the turbine, and an exhaust chamber.

The rotor is rotatably supported by bearings at opposite ends thereof. A plurality of disks is fixed to the rotor so that respective blades are attached thereto, and a driving shaft of a driving unit, such as a generator or the like, is coupled to an end side of the rotor on the exhaust chamber side.

Since such a gas turbine is devoid of a reciprocating mechanism such as a piston of a 4-stroke engine, there are no friction-causing features such as piston-cylinder contact parts, and thus the turbine has advantages of a significant reduction in lubricant consumption and amplitude of vibration, which are typical characteristics of a reciprocating mechanism, whereby high speed movement is enabled.

Briefly explaining the operation of the gas turbine, air compressed by the compressor is mixed with fuel and combusted in the combustor to provide hot combustion gas, which is then injected towards the turbine. As the injected combustion gas passes through the turbine vanes and the turbine blades, a rotating force is generated and the rotor rotates by the generated rotating force.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a leaf spring inserted between a sealing member installed between various components of a gas turbine to prevent an inflow and outflow of gases a mating sealing member, and a sealing assembly including the same.

In an aspect of the present disclosure, there is provided a leaf spring arranged between a sealing member having a locking groove and a mating sealing member having an insertion space into which the sealing member and the leaf spring are inserted, the leaf spring including: a curved body section; a locking protrusion protruding in one direction at an end of the body section to be inserted into the locking groove of the sealing member; and a detachment-prevention protrusion protruding in a direction opposite to the locking protrusion and configured to into contact with one surface of the mating sealing member and prevent the locking protrusion from being detached from the locking groove when the body section is compressed by the sealing member and the mating sealing member.

In an embodiment, the body section may be curved such that a height thereof gradually increases to a predetermined height from both ends to an intermediate portion thereof.

In an embodiment, the locking protrusion may be formed in one or more numbers to protrude downward from the end of the body section.

In an embodiment, the detachment-prevention protrusion may be formed in one or more numbers to protrude upward from the end of the body section.

In an embodiment, two locking protrusions may be formed to protrude downward from the end of the body section, and one detachment-prevention protrusion may be formed to protrude upward between the two locking protrusions.

In another aspect of the present disclosure, there is provided a sealing assembly including: a sealing member having a locking groove; a mating sealing member having an insertion space into which the sealing member is inserted; and a leaf spring inserted into the insertion space and disposed between the sealing member and the mating sealing member, the leaf spring including: a curved body section; a locking protrusion protruding in one direction at an end of the body section to be inserted into the locking groove of the sealing member; and a detachment-prevention protrusion protruding in a direction opposite to the locking protrusion and configured to into contact with one surface of the mating sealing member and prevent the locking protrusion from being detached from the locking groove when the body section is compressed by the sealing member and the mating sealing member.

In an embodiment, the body section may be curved such that a height thereof gradually increases to a predetermined height from both ends to an intermediate portion thereof.

In an embodiment, the locking protrusion may be formed in one or more numbers to protrude downward from the end of the body section.

In an embodiment, the detachment-prevention protrusion may be formed to protrude in one or more numbers and protrude upward from the end of the body section.

In an embodiment, two locking protrusions may be formed to protrude downward from the end of the body section, and one detachment-prevention protrusion may be formed to protrude upward between the two locking protrusions.

In a further aspect of the present disclosure, there is provided a gas turbine including: a sealing assembly mounted between components of the gas turbine to prevent an inflow or outflow of gas, the sealing assembly including:

a sealing member mounted in a gap region through which the gas flows inwards or outwards and having a locking groove; a mating sealing member having an insertion space into which the sealing member is inserted; and a leaf spring inserted into the insertion space and disposed between the sealing member and the mating sealing member, the leaf spring including: a curved body section; a locking protrusion protruding in one direction at an end of the body section to be inserted into the locking groove of the sealing member; and a detachment-prevention protrusion protruding in a direction opposite to the locking protrusion and configured to come into contact with one surface of the mating sealing member and prevent the locking protrusion from being detached from the locking groove when the body section is compressed by the sealing member and the mating sealing member.

In an embodiment, the body section may be curved such that a height thereof gradually increases to a predetermined height from both ends to an intermediate portion thereof.

In an embodiment, the locking protrusion may be formed in one or more numbers to protrude downward from the end of the body section.

In an embodiment, the detachment-prevention protrusion may be formed to protrude in one or more numbers and protrude upward from the end of the body section.

In an embodiment, two locking protrusions may be formed to protrude downward from the end of the body section, and one detachment-prevention protrusion may be formed to protrude upward between the two locking protrusions.

Other details of implementations according to various aspects of the present disclosure are included in the detailed description below.

According to embodiments of the present disclosure, the sealing performance between the various components of a gas turbine is increased to improve the efficiency of a gas turbine as a whole.

DETAILED DESCRIPTION OF THE INVENTION

Hereinafter, exemplary embodiments of the present disclosure will be described in detail with reference to the accompanying drawings. However, it should be noted that the present disclosure is not limited thereto, but may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the terms "comprising" or "including" specifies the presence of stated features, numbers, steps, operations, elements, parts, or combinations thereof, but does not preclude the presence or addition of one or more other features, numbers, steps, operations, elements, parts, or combinations thereof. Hereinafter, preferred embodiments of the present disclosure will be described in detail with reference to the accompanying drawings.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 1:
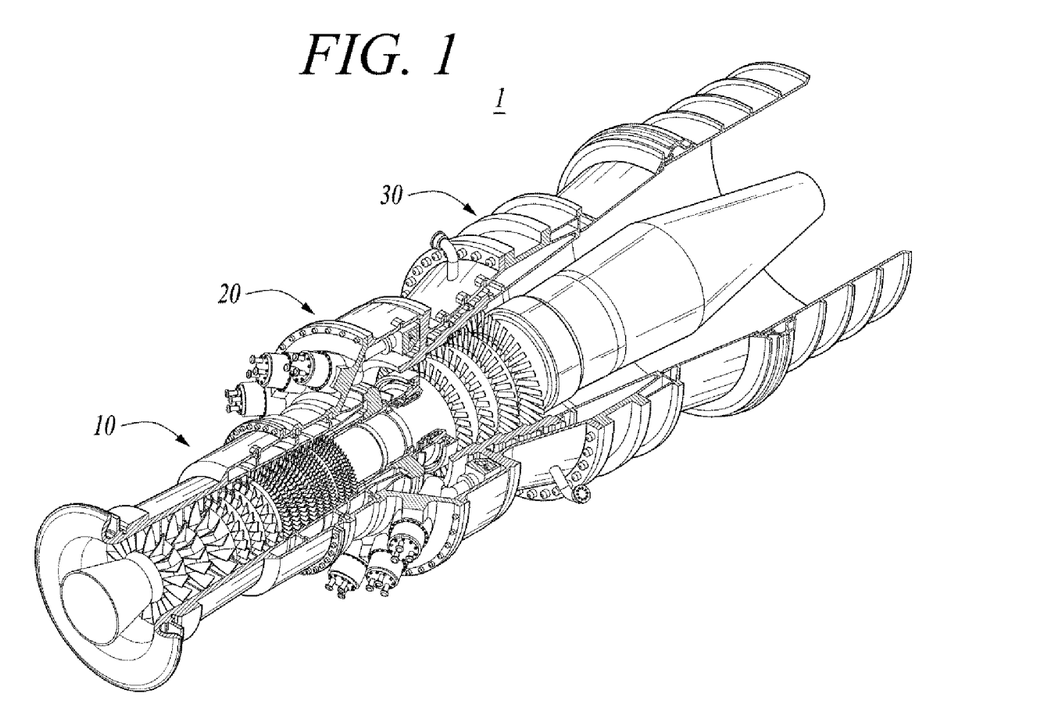
FIG. 1 is a view illustrating the interior of a gas turbine according to an embodiment of the present disclosure.
Figure 2:
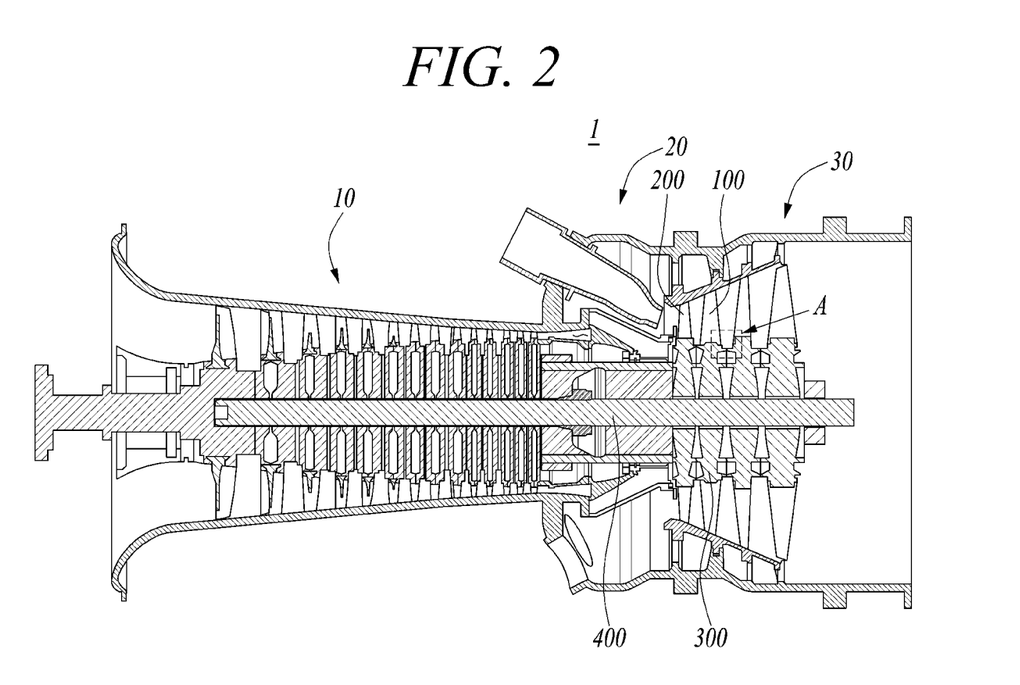
FIG. 2 is a view conceptually illustrating a section of the gas turbine according to the embodiment of the present disclosure.

FIG. 1 is a perspective view illustrating the interior of a gas turbine according to an exemplary embodiment the present disclosure, and FIG. 2 is a view conceptually illustrating a section of the gas turbine.

As illustrated in FIGS. 1 and 2, the gas turbine 1 includes a compressor 10, a combustor 20, and a turbine 30. The compressor 10 serves to compress an inflow or outflow of air at a high pressure, and delivers the compressed air to the combustor side. The compressor 10 has a plurality of compressor blades installed circumferentially, which rotate by receiving a portion of the power generated from the rotation of the turbine 30, so that the air is fed toward the combustor 20 while being compressed by the rotation of the blade combustor. The size and installation angle of the blade in the compressor 10 may vary depending on the installation location.

The compressed air from the compressor 10 is fed to the combustor 20 so that the compressed air is mixed with fuel provided by fuel-nozzle modules arranged in an annular shape. The air-fuel mixture is combusted in a combustion chamber. The high-temperature combustion gas generated due to combustion is discharged to the turbine 30 to rotate the same.

The turbine 30 includes turbine rotor disks 300 that are arranged in a multi-stage around a center tie rod 400 that axially couples the turbine rotor disks 300. The turbine rotor disks 300 include a plurality of turbine blades 100 arranged circumferentially. The turbine blade 100 may be coupled to the turbine rotor disk 300 in a dovetail-fit or the like. In addition, a turbine vane 200 is provided between the turbine blades 100 while being fixed to a housing to guide the flow direction of the combustion gas passing through the turbine blades 100.

As illustrated in FIG. 2, the turbine 30 may include n turbine vanes 200 and n turbine blades 100 alternately arranged along the axial direction of the gas turbine 1. In other words, turbine vanes 200 and turbine blades 100 are arranged in n multiple stages. The hot combustion gas passes through the turbine vanes 200 and the turbine blades 100 along the axial direction to rotate the turbine blades 100.

Various sealing members for preventing the inflow and outflow of compressed air and/or combustion gas are installed between various components of a gas turbine. The sealing members are installed by being inserted into a mating sealing member. In the following description, the sealing between a turbine blade 100 and a turbine vane 200 will be described as an example, but the present disclosure is not limited thereto. For example, the sealing described below may be applied to a compressor blade and a compressor vane or to any other portion in the gas turbine where a sealing is required.

Figure 3:
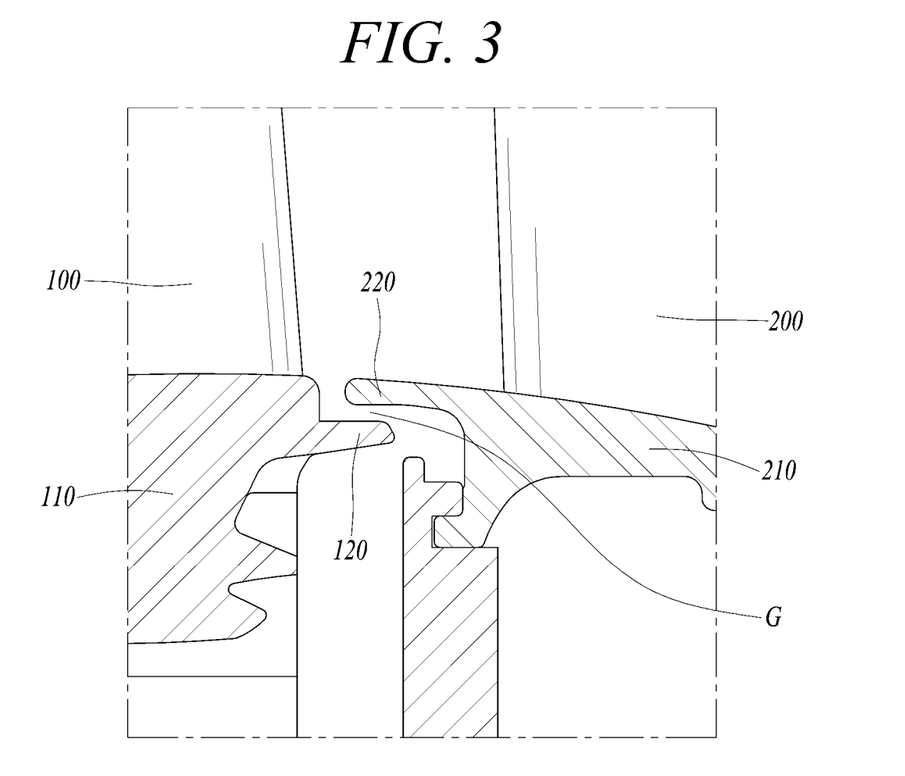
FIG. 3 is an enlarged cross-sectional view illustrating a portion of a turbine to which a leaf spring is applied.

FIG. 3 is an enlarged cross-sectional view illustrating a portion, i.e., a part of section A of FIG. 2, of a turbine to which a leaf spring may be applied according to an embodiment of the present disclosure.

Referring to FIG. 3, a blade root member 110 is formed at a lower portion of a turbine blade 100, and a sealing wing 120 extending in an axial direction is formed on a lateral side surface of the blade root member 110. In addition, a turbine vane inner shroud 210 is formed at a lower portion of a turbine vane 200, and a sealing plate 220 extending in the axial direction is formed on a lateral side surface of the turbine vane inner shroud 210. The sealing plate 220 is spaced apart from the sealing wing 120 by a predetermined distance to form a gap G. Since gas flows inward or outward through the gap G, a sealing member may be installed in the gap G according to an embodiment, to prevent such inward/outward gas flow.

Figure 4:
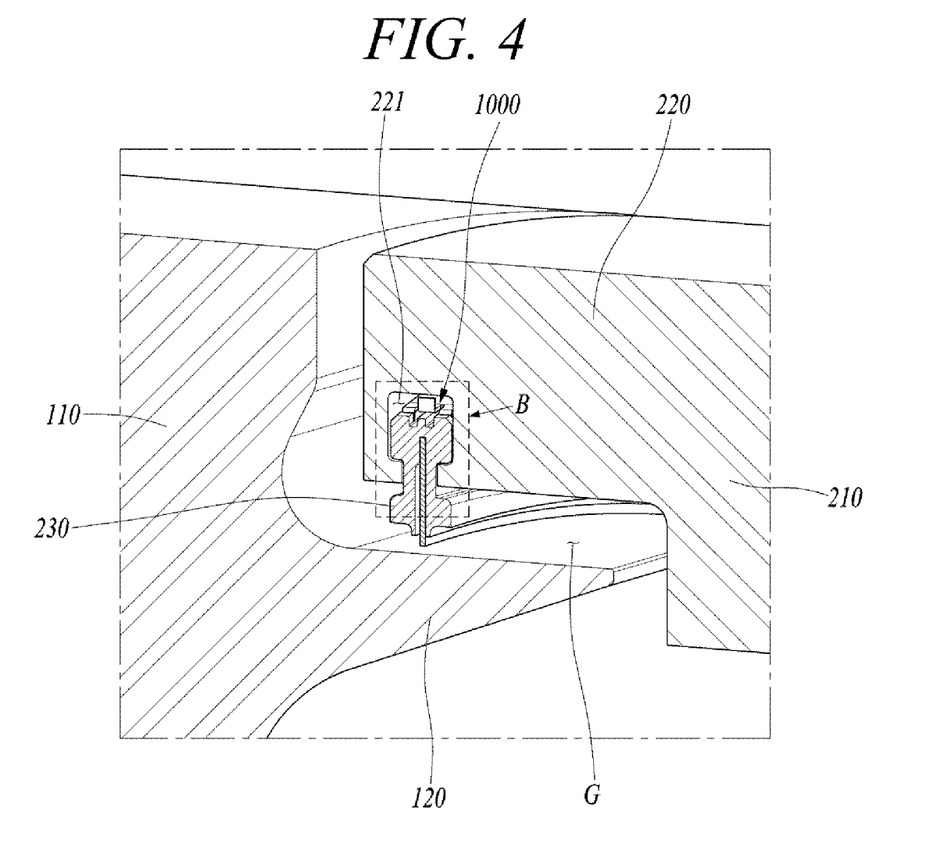
FIG. 4 is a view illustrating a state in which the leaf spring is inserted between a sealing member and a mating sealing member according to an embodiment of the present disclosure.

FIG. 4 is a view illustrating a state in which the leaf spring is inserted between a sealing member and a mating sealing member according to an embodiment of the present disclosure.

Referring to FIG. 4, the sealing plate 220 may be provided with an insertion space 221 into which the sealing member 230 is inserted according to an embodiment. The insertion space 221 may be formed at the lower surface of the sealing plate 220 from the lower surface toward a radially outward direction. The sealing member 230 may have a predetermined shape to block an inflow or outflow of gas through the gap G. The insertion space 221 and the sealing member 230 are formed to extend in a circumferential direction to have an annular ring shape in general. In this case, the sealing plate 220 becomes a mating sealing member with which the sealing member 230 is assembled. In other words, the sealing member 230 may be inserted into the sealing plate 220. According to an embodiment, a part of the sealing member 230 may be disposed to protrude out of the insertion space 221 and to block an inflow/outflow of gas in the gap G while another part of the sealing member 230 is disposed inside the insertion space 221. It is understood that, among various components of a gas turbine, any other components into which the sealing member is inserted may be considered the mating sealing members, according to an embodiment.

Meanwhile, according to an embodiment, a leaf spring 1000 may be disposed between the sealing member and the mating sealing member for convenience of assembly. The leaf spring, to successively function, is preferred to satisfy the following conditions.

① Upon being assembled with the sealing member, the leaf spring should not be separated from the sealing member. (the "First Condition")

② Even after the assembly of the sealing member and the leaf spring is placed on the mating sealing member and a pressing or compressing force is applied from the mating sealing member toward the leaf spring, the leaf spring should not be separated from the sealing member. (the "Second Condition")

Figure 5:
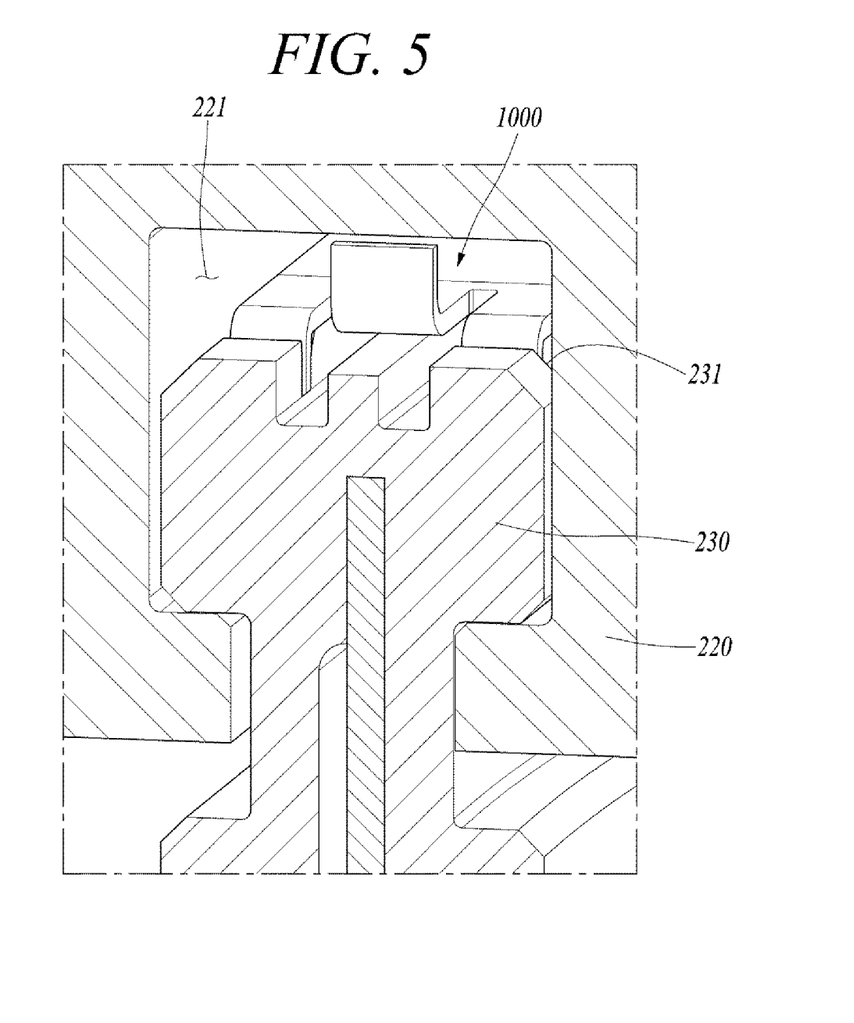
FIG. 5 is an enlarged view of section B of FIG. 4.

This will be described with reference to FIGS. 5 and 6. FIG. 5 is an enlarged view of section B of FIG. 4, and FIG. 6 is a perspective view illustrating a leaf spring according to an embodiment of the present disclosure.

Figure 6:
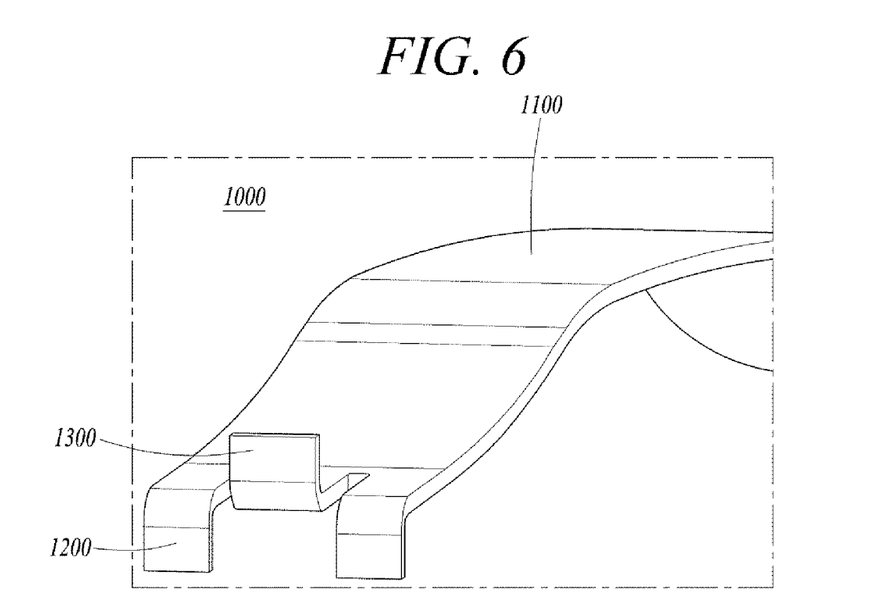
FIG. 6 is a perspective view illustrating a leaf spring according to an embodiment of the present disclosure.

Referring to FIGS. 5 and 6, the leaf spring 1000 according to an embodiment of the present disclosure includes a body section 1100, a locking protrusion 1200, and a detachment-prevention protrusion 1300. The leaf spring 1000 is disposed in the insertion space 221 between the sealing member 230 and the mating sealing member (e.g., the sealing plate 220). Hereinafter, reference numeral 220 will also refer to a mating sealing member.

The body section 1100 is formed in a curved bar shape in general. The body section 1100 is curvedly formed such that a height thereof gradually increases to a predetermined height from both ends to a center portion thereof. A virtual plane passing the both ends of the of the body section 110 is the ground for measuring the predetermined height and the direction from the virtual plane toward the center portion having the predetermined height may be referred to as a height direction. Here, the "predetermined height" may be set differently for each component of a gas turbine where a sealing is required, for example, in this case, for the sealing member 230 and the mating sealing member 220 (i.e., the sealing plate 220, for an embodiment described herein). The body section 1100 may be configured to apply an elastic force pushing the sealing member 230 away from the mating sealing member 220. The body section 1100 may be in a form with a curved shape at a portion toward an end to smoothly meet the sealing member and another curved shape at a portion toward the center portion to smoothly meet the mating sealing member.

According to an embodiment, the body section 1100 may be provided with a locking protrusion 1200 protruding in a first direction at one end of the body section 1100. For example, the locking protrusion 1200 may be formed to protrude downward from the end of the body section 1100 according to an embodiment. The downward direction may be the opposite direction to the height direction. One or more locking protrusions 1200 may be formed at the end of the body section 1100. As an example, two locking protrusions 1200 are illustrated in the drawings. According to an embodiment the locking protrusion 1200 is fitted and inserted into a locking groove 231 formed in the sealing member 230.

According to an embodiment, a detachment-prevention protrusion 1300 may be formed to protrude in a second direction at the end of the body section 1100. For example, the detachment-prevention protrusion 1300 may be formed to protrude upward from the end of the body section 1100 according to an embodiment. The upward direction may be the same direction to the height direction. One or more detachment-prevention protrusions 1300 may be formed at the end of the body section 1100. As an example, in the drawings, it is illustrated that one detachment-prevention protrusion 1300 is formed to protrude upward between two locking protrusions 1200 formed to protrude downward.

Figure 7:
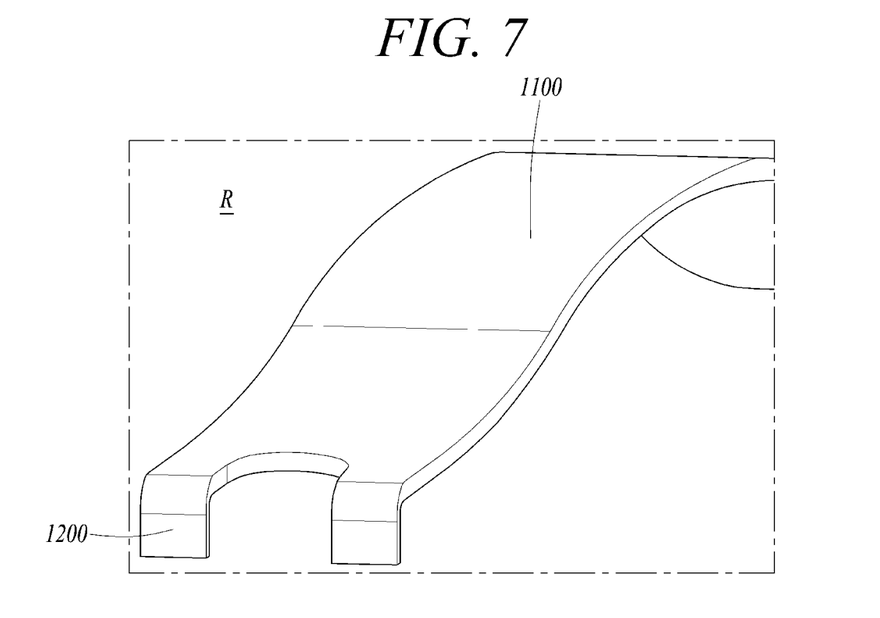
FIG. 7 is a perspective view illustrating a leaf spring without a detachment-prevention protrusion.
Figure 8:
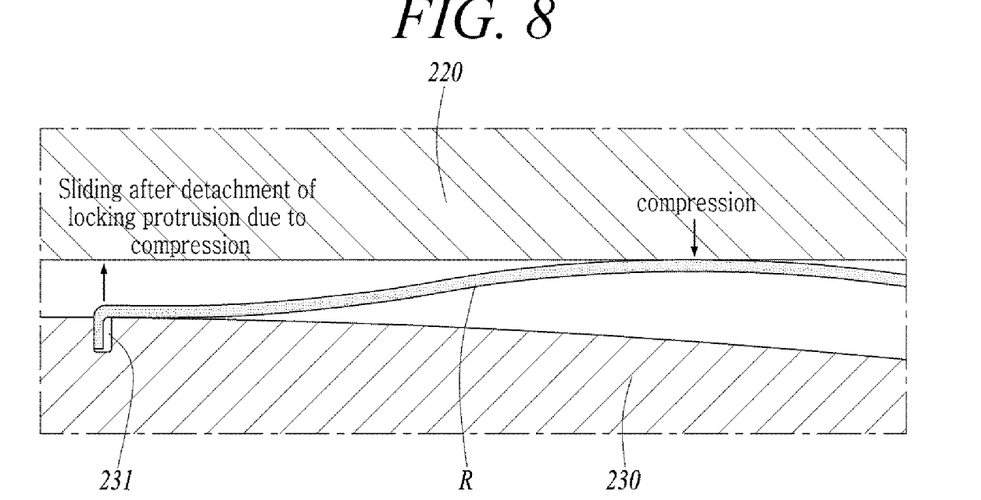
FIG. 8 is a view illustrating a potential disadvantage with the leaf spring of FIG. 7.

FIG. 7 is a perspective view illustrating a leaf spring R without the detachment-prevention protrusion 1300, and FIG. 8 is a view to illustrate a potential disadvantage with the leaf spring R of FIG. 7.

Referring to FIG. 7, a leaf spring R includes a body section 1100 and a locking protrusion 1200, without the detachment-prevention protrusion 1300.

Referring to FIG. 8, upon assembly with the sealing member 230, the leaf spring R may remain locked to and is not detached from the sealing member 230.

However, when the assembly of the sealing member 230 and the leaf spring R is disposed in the insertion space between the sealing member 230 and the mating sealing member 220 and the pressing or compressing force is applied from the mating sealing member 220 to the leaf spring R, the locking protrusion 1200 may moves upwards as a reaction to the compression force. The upward movement of the locking protrusion 1200 may be caused due to the curved shape at a portion toward the end in the body section. When the locking protrusion 1200 moves upward, the locking protrusion 1200 may escape from the locking groove 231, so the leaf spring R may slide on an upper surface of the sealing member 230. Alternatively, even if the locking protrusion 1200 is not detached during a normal state, the locking protrusion may be detached from the locking groove 231 due to vibration generated during operation of a gas turbine. That is, with the leaf spring according to FIG. 7, the First Condition among the above described conditions for the successful leaf spring may be satisfied, but the Second Condition may not be satisfied. This can cause failure between various components of a gas turbine may occur, thereby reducing the overall operation efficiency of a gas turbine.

Figure 9:
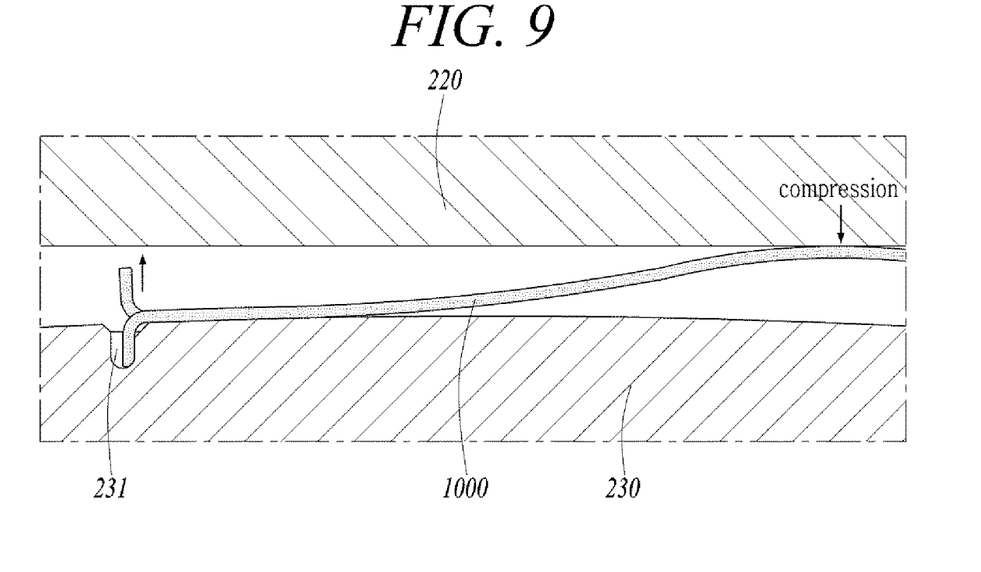
FIG. 9 is a view illustrating an installation state of a leaf spring according to an embodiment of the present disclosure.

FIG. 9 is a view illustrating an installation state of a leaf spring with detachment-prevention protrusion 1300 according to an embodiment of the present disclosure.

Referring to FIG. 9, the leaf spring 1000 maintains a fixed and locked state when assembled with the sealing member 230. In addition, when the assembly of the sealing member 230 and the leaf spring 1000 is disposed in the insertion space between the sealing member 230 and the mating sealing member 220 and is pressed or compressed by the mating sealing member 220, even though the locking protrusion 1200 is subjected to an upward movement force due to a reaction to the compression force, the detachment-prevention protrusion 1300 comes into contact with an inner wall of the insertion space of the mating sealing member 220 so that the movement of the locking protrusion 1200 is restricted. According to embodiment, the detachment-prevention protrusion 1300 may be in a length such that the gap between the tip of the detachment-prevention 1300 and the mating sealing member 220 is shorter than the length of the locking protraction 1200 inserted into the locking groove 231. As a result, it is possible to prevent the locking protrusion 1200 from being detached during the normal state. This can improve the sealing performance between the various components of a gas turbine, thereby improving the operation efficiency of the gas turbine as a whole.

Meanwhile, in the above description, the leaf spring 1000 has been described as a single unit. However, according to an embodiment, when designing a gas turbine, the sealing member 230 and the mating sealing member 220, and the leaf spring 1000 may be designed together.

That is, when the mating sealing member 220 is determined, the sealing member 230 having a suitable shape and a leaf spring 100 having a suitable shape and size to be disposed between the sealing member 230 and the mating sealing member 220 may be designed accordingly. Therefore, the sealing member 230 and the mating sealing member 230, and the leaf spring 1000 may constitute a sealing assembly.

While the embodiments of the present disclosure have been described, it will be apparent to those skilled in the art that various modifications and variations can be made in the present disclosure through addition, change, omission, or substitution of components without departing from the spirit of the invention as set forth in the appended claims, and such modifications and changes may also be included within the scope of the present disclosure. Also, it is noted that any one feature of an embodiment of the present disclosure described in the specification may be applied to another embodiment of the present disclosure.

The invention claimed is:

1. A leaf spring, wherein the leaf spring is arranged between a sealing member having a locking groove and a mating sealing member having an insertion space into which the sealing member and the leaf spring are inserted, the leaf spring comprising:
   a curved body section;
   a locking protrusion protruding in one direction at an end of the body section to be inserted into the locking groove of the sealing member; and
   a detachment-prevention protrusion protruding, at the end of the body section, in a direction opposite to the locking protrusion and configured to come into contact with one surface of the mating sealing member and prevent the locking protrusion from being detached from the locking groove when the body section is compressed by the sealing member and the mating sealing member,
   wherein the curved body section has a curved central surface at an intermediate portion of the body section and a curved end surface toward the end of the curbed body section, the curved central surface and the curved end surface being curved in opposite directions to each other, the curved central surface being curved such that the curved central surface meets the one surface of the mating sealing member smoothly and the curved end surface being curved such that the curved end surface of the both section meets a surface of the sealing member smoothly.

2. The leaf spring of claim 1, wherein the body section is curved such that a height thereof gradually increases to a predetermined height from both ends to an intermediate portion thereof.

3. The leaf spring of claim 1, wherein the locking protrusion is formed in one or more numbers to protrude downward from the end of the body section.

4. The leaf spring of claim 1, wherein the detachment-prevention protrusion is formed in one or more numbers to protrude upward from the end of the body section.

5. The leaf spring of claim 1, wherein two locking protrusions are formed to protrude downward from the end of the body section, and one detachment-prevention protrusion is formed to protrude upward between the two locking protrusions.

6. The leaf spring of claim 1,
   wherein the curved end surface and the curved central surface are formed such that when a compression force is applied to the intermediate portion of the body section in a first direction, the end of the body section is subject to a movement in a second direction, the second direction being opposite direction of the first direction, due to the opposite directions in which the curved end surface and the curved central surface are curved, respectively.

7. The leaf spring of claim 6,
   wherein the locking protrusion and the detachment-prevention protrusion have lengths such that when the compression force is applied to the intermediate portion of the body section in the first direction, a tip of the detachment-prevention protrusion is configured to move in the second direction and come into contact with the one surface of the mating sealing member before a tip of the locking protrusion comes out of the locking groove.

8. The leaf spring of claim 1,
wherein the detachment-prevention protrusion is configured such that a gap between a tip of the detachment-prevention and the mating sealing member is smaller than a length of the locking protrusion.

9. A sealing assembly comprising:
a sealing member having a locking groove;
a mating sealing member having an insertion space into which the sealing member is inserted; and
a leaf spring inserted into the insertion space and disposed between the sealing member and the mating sealing member, the leaf spring comprising:
a curved body section;
a locking protrusion protruding in one direction at an end of the body section to be inserted into the locking groove of the sealing member; and
a detachment-prevention protrusion protruding, at the end of the body section, in a direction opposite to the locking protrusion and configured to into contact with one surface of the mating sealing member and prevent the locking protrusion from being detached from the locking groove when the body section is compressed by the sealing member and the mating sealing member,
wherein the curved body section has a curved central surface at an intermediate portion of the body section and a curved end surface toward the end of the curbed body section, the curved central surface and the curved end surface being curved in opposite directions to each other, the central surface being curved such that the curved central surface meets the one surface of the mating sealing member smoothly and the curved end surface being curved such that the curved end surface of the both section meets a surface of the sealing member smoothly.

10. The sealing assembly of claim 9, wherein the body section is curved such that a height thereof gradually increases to a predetermined height from both ends to an intermediate portion thereof.

11. The sealing assembly of claim 9, wherein the locking protrusion is formed in one or more numbers to protrude downward from the end of the body section.

12. The sealing assembly of claim 9, wherein the detachment-prevention protrusion is formed in one or more numbers to protrude upward from the end of the body section.

13. The sealing assembly of claim 9, wherein two locking protrusions are formed to protrude downward from the end of the body section, and one detachment-prevention protrusion is formed to protrude upward between the two locking protrusions.

14. A gas turbine comprising:
a sealing assembly mounted between components of the gas turbine to prevent an inflow or outflow of gas, the sealing assembly comprising:
a sealing member mounted in a gap region through which the gas flows inwards or outwards and having a locking groove;
a mating sealing member having an insertion space into which the sealing member is inserted; and
a leaf spring inserted into the insertion space and disposed between the sealing member and the mating sealing member, the leaf spring comprising:
a curved body section;
a locking protrusion protruding in one direction at an end of the body section to be inserted into the locking groove of the sealing member; and
a detachment-prevention protrusion protruding, the end of the body section, in a direction opposite to the locking protrusion and configured to come into contact with one surface of the mating sealing member and prevent the locking protrusion from being detached from the locking groove when the body section is compressed by the sealing member and the mating sealing member,
wherein the curved body section has a curved central surface at an intermediate portion of the body section and a curved end surface toward the end of the curbed body section, the curved central surface and the curved end surface being curved in opposite directions to each other, the curved central surface being curved such that the curved central surface meets the one surface of the mating sealing member smoothly and the curved end surface being curved such that the curved end surface of the both section meets a surface of the sealing member smoothly.

15. The gas turbine of claim 14, wherein the body section is curved such that a height thereof gradually increases to a predetermined height from both ends to an intermediate portion thereof.

16. The gas turbine of claim 14, wherein the locking protrusion is formed in one or more numbers to protrude downward from the end of the body section.

17. The gas turbine of claim 14, wherein the detachment-prevention protrusion is formed in one or more numbers to protrude upward from the end of the body section.

18. The gas turbine of claim 14, wherein two locking protrusions are formed to protrude downward from the end of the body section, and one detachment-prevention protrusion is formed to protrude upward between the two locking protrusions.

\* \* \* \* \*